Nov. 22, 1960  F. H. LEGGE ET AL  2,961,073
PARKING BRAKE

Filed Sept. 17, 1957  2 Sheets-Sheet 1

FREDERICK H. LEGGE
MILTON E. ROSS
INVENTOR.

BY
ATTORNEY

Nov. 22, 1960  F. H. LEGGE ET AL  2,961,073
PARKING BRAKE
Filed Sept. 17, 1957  2 Sheets-Sheet 2

FREDERICK H. LEGGE
MILTON E. ROSS
INVENTOR.

BY
Vernon D. Beehler
ATTORNEY

United States Patent Office 2,961,073
Patented Nov. 22, 1960

2,961,073
PARKING BRAKE

Frederick H. Legge, La Crescenta, and Milton E. Ross, Burbank, Calif., assignors to Aerol Co., Inc., Los Angeles, Calif., a corporation of California Filed Sept. 17, 1957, Ser. No. 684,549

3 Claims. (Cl. 188—78)

The invention relates to caster wheels and has particular reference to a parking brake for caster wheels which makes use of a brake drum located adjacent the hub and within the confines of the rim.

The accelerated demand for a great variety of caster wheels for use in all sorts of short distance hauling has prompted the use of wheels capable of equipment with pneumatic tires. In addition to the more usual type of caster wheel the requirements heretofore have been largely met with solid rubber tires and even on occasions with metal tires. Use of wheels of a type suited to pneumatic tires has, however, created other demands in connection with braking equipment. Although running brakes are very rarely needed for equipment of this kind, parking brakes are a necessity on one or more caster wheels used to support a truck or dolly. Although parking brakes having brake shoes directly engaging the wheel at its tread portion or side portion have met with some success in certain types of wheels, brakes of this kind are not acceptable for soft tires which are exemplified by pneumatic tires. Also brakes of a type which are applied to the exterior of the wheel near the tread portion or along the sides adjacent the tread portion, tend to protrude objectionably to locations where they are likely to be struck or kicked inadvertently which might cause injury or perhaps dislodge the brake or even be struck by some hard moving object with sufficient force to damage the brake. Those brakes which have been built in such fashion as to attempt concealment of the working parts have had certain disadvantages in making the operative portion of the brake readily accessible for all positions of the wheel.

It is therefore among the objects of the present invention to provide a new and improved parking brake which makes use of a brake drum and brake shoe assembly contained therein in such fashion that it is readily adapted to and acceptable as a parking brake for wheels used as caster wheels.

Another object of the invention is to provide a new and improved parking brake for caster wheels which is readily usable and acceptable for wheels provided with a rim suited to the reception of pneumatic type tires and similar tires, the braking apparatus being such that it is centrally located near the hub while at the same time providing operating elements which can readily be reached by the operator when the brake is to be set and released.

Still another object of the invention is to provide a new and improved parking brake for caster wheels which is compact in its design and rugged in construction as well, the combination being such that the brake can readily be concealed within the confines of the rim of the wheel except for the operating mechanism which extends outwardly to a readily accessible location, the concealed construction being such as to provide not only an effective braking mechanism but also to preserve the neatness of appearance on the exterior.

Still another object of the invention is to provide a new and improved brake drum and brake shoe type parking brake which can be made of relatively soft material such as aluminum, the structure being so designed as to compensate for the tendency of aluminum to expand under pressure by taking advantage of an effective location of those parts subject to expansion whereby to make use of the resistance of parts of the wheel itself.

Still further among the objects of the invention is to provide a new and improved brake drum and brake shoe type parking brake wherein a convenient and simple adjustment for setting the brakes to accommodate for both initial installation and subsequent wear is provided at a location such that it is readily accessible With these and other objects in view, the invention consists in the construction, arrangement and combination of the various parts of the device whereby the objects contemplated are attained, as hereinafter set forth, pointed out in the appended claims and illustrated in the accompanying drawings.

Figure 1:
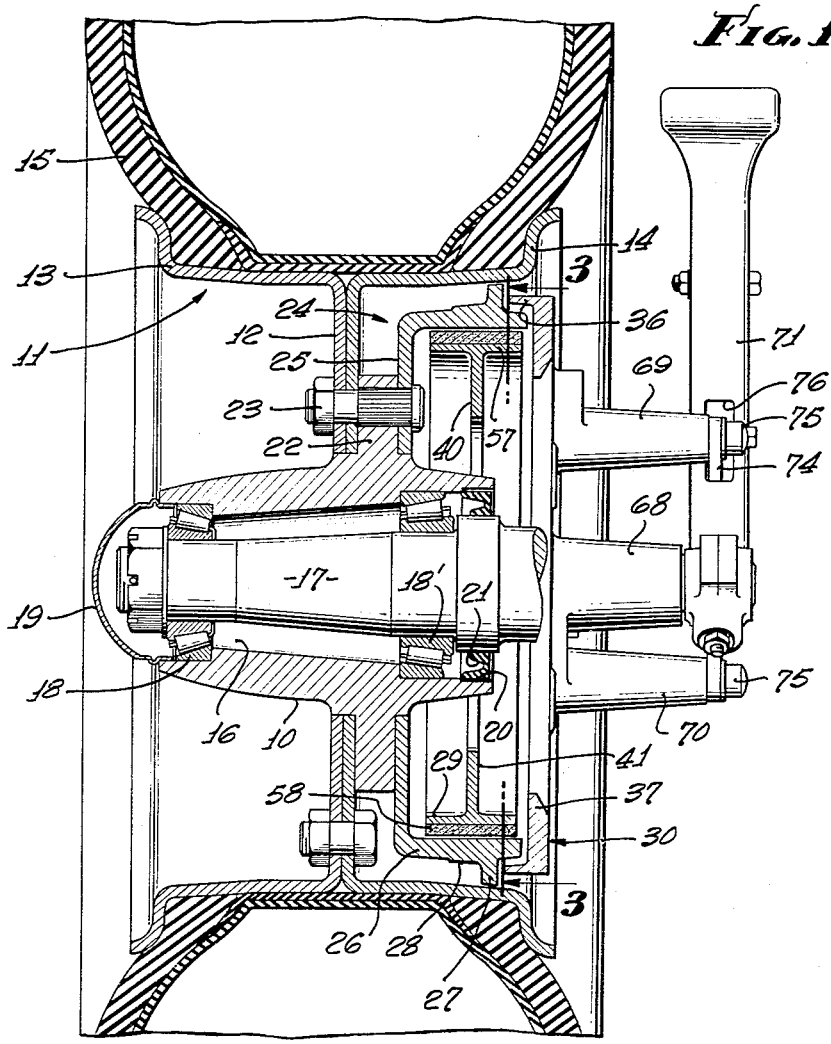
Figure 1 is a longitudinal sectional view of a complete caster wheel equipped with the brake of the invention herein disclosed taken on the line 1—1 of Figure 2.
Figure 4:
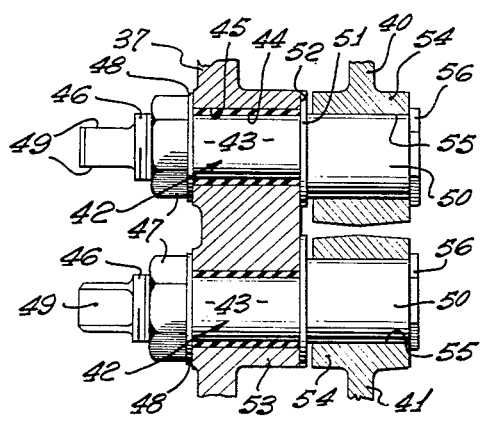
Figure 4 is a fragmentary longitudinal sectional view of brake adjusting mechanism taken on the line 4—4 of Fig. 2.
Figure 2:
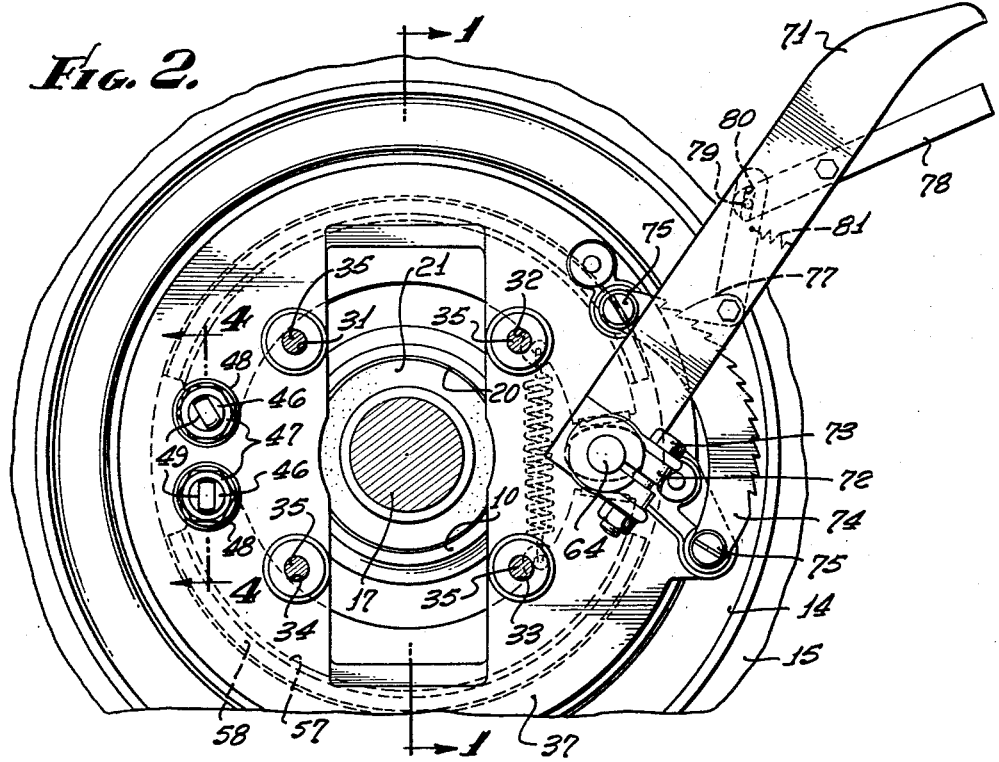
Figure 2 is a side elevational view of the device of Figure 1 with portions partially broken away.

In an embodiment of the invention chosen for the purpose of illustration there is shown a caster wheel comprising the combination of a hub 10, and a rim indicated generally by the reference character 11 joined to the hub by a web or intermediate portion 12. In the form of device chosen for the purpose of illustration the rim of the caster wheel is relatively wide and constructed of outer and inner rim sections 13 and 14, respectively, formed in a substantially conventional manner for reception of a pneumatic tire 15.

The hub contains a hub cavity 16 within which is located a stub axle 17 supported on outer and inner bearings 18 and 18', respectively. A hub cap 19 encloses the hub cavity 16.

The stub axle is one of a type which can readily be mounted on and form part of a somewhat conventional chassis which is to be supported by the wheel. A seal recess 20 is provided near the inner end of the hub cavity in which is located an expansible seal 21.

Extending outwardly from the hub is an annular anchor flange 22 to which the web 12 is secured by bolts 23. A brake drum 24 has a bottom 25 thereof bolted to the anchor flange by use of the same bolts 23. On the brake drum 24 is an annular wall 26 on the exterior of which is a rim supporting flange 27 of such circumference and location as to be capable of mounting the inside face of the inner rim section 14 and to properly locate the rim upon the hub when the web is bolted in place. On the outer side of the rim supporting flange 27 is a surface 28 which may be given such size and configuration as to be capable of reception of the inner rim section of a wheel of smaller diameter when need for such smaller wheel arises. It will be noted, however, that both the rim supporting flange 27 and the surface 28 are at a location immediately opposite a braking surface 29 on the inside face of the annular wall 26.

Extending over the edge of the rim 26 is a mounting plate assembly 30. This is the plate which is employed to secure the braking mechanism to the chassis and for this purpose there are provided bolt holes 31, 32, 33 and 34, receptive of bolts 35 which are adaptable to bolt the mounting plate assembly to a proper location on the chassis (not shown). At the exterior circumference of the mounting plate assembly is an outwardly extending circumferential flange 36 on a plate element 37. Pivotally mounted on the plate element 37 at the inside face are brake shoes 40 and 41 which cooperate as a pair. To mount the shoes there is provided in each instance a pin 42 of composite shape having a cylindrical portion 43 contained within a bushing 44 in an appropriate hole 45 in the plate element 37. At the outer end of the pin is a threaded neck 46 which is engaged by a lock nut 47 and washer 48. Flats 49 are formed on the outermost end of the pin for reception of a wrench used when the brake shoes are to be adjusted.

At the inner end of the pin is a second cylindrical portion 50, larger in diameter than the portion 43, the center axis of which is offset with relation to the center axis of the cylindrical portion 43. A washer 51 bearing against an inside face 52 of a boss 53 permits the pin to be drawn snug and tight upon the plate element 37. The enlargement 54 of the brake shoe 40 has a hole 55 therethrough which pivotally receives the cylindrical portion 50. The relationship shown is one which permits an enlargement 54 to be slid first over the portion 43 and then in place on the portion 50 before the portion 43 is inserted into the hole 45. A hex head 56 on the cylindrical portion 50 contains the brake shoe in place in a position such that it is free to tilt.

On each of the brake shoes 40, 41 is an arcuate band 57 upon which is mounted a suitable brake lining 58.

At the ends of the brake shoes opposite from the ends engaged by the pins 42 there are provided bearing plates 60, preferably of steel, inasmuch as the brake shoes in the chosen embodiment are normally constructed of aluminum as is also the brake drum. A cam 61 having opposite cammed faces 62 and 63 bears against the bearing plates and upon rotation of a shaft 64 upon which the cam is fixed, the cam rotation can be employed to expand the positions of the brake shoes outwardly into engagement with the braking surface 29.

Figure 3:
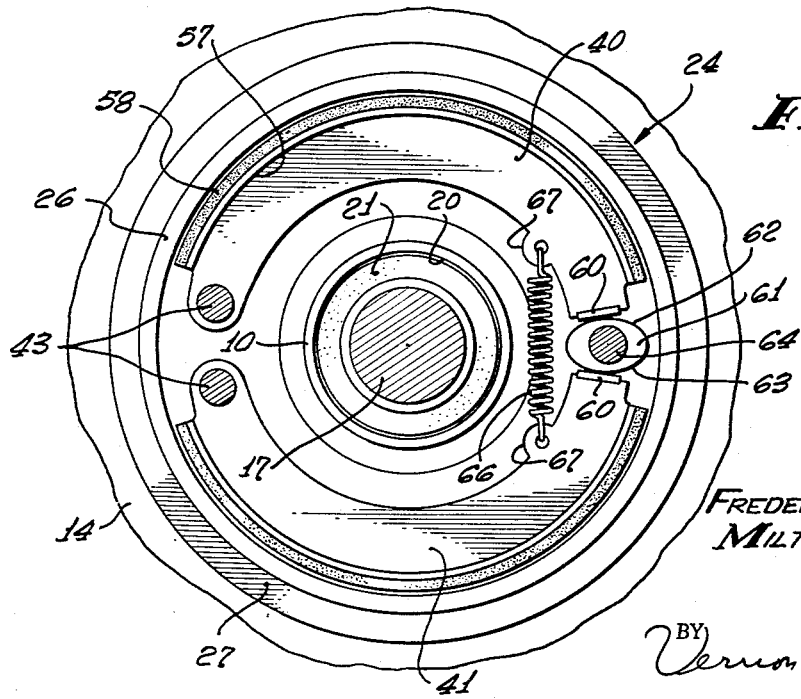
Figure 3 is a fragmentary vertical sectional view of the interior of the brake taken on the line 3—3 of Figure 1.

It will be understood from the description of the pins 42 that the pins can be rotated in one direction or another to set the connected ends of the brake shoes either nearer the braking surface 29 or further away from that surface, depending upon whether or not the brake is to be set tighter or looser. The setting selected can be made relatively permanent by locking the pin in its adjusted position by use of the lock nut 47. Any adjustment, however, which might be needed at any time can be readily made by loosening the lock nuts and readjusting the pins, the adjustment being readily possible because of the exposed location of the neck 46 of each of the pins. A return spring 66 secured at opposite ends to ears 67 on the brake shoes serves to return the brake shoes to released position upon a return of the cam 61 to the position shown in Figure 3.

To accommodate the shaft 64 there is provided a post 68 which is mounted upon and forms part of the plate element 37 and extends outwardly for some distance beyond the plane of the inner edge of the inner rim section 14. Additional posts 69 and 70 mounted upon appropriate portions of the plate element 37 are of comparable length.

A brake arm 71 is non-rotatably attached to the shaft 64 by means of a clamp 72 closed by a bolt 73. By making the end of the shaft 64 serrated and the interior of the clamp 72 serrated, a secure non-rotational engagement can be assured.

To hold the setting of the brake in a selected adjustment there is provided a ratchet bar 74 having its ends fastened respectively to the posts 69 and 70 by suitable screws 75. The ratchet bar extends through an aperture 76 in the brake arm and is located in a position such as to be engaged by a ratchet arm 77, pivotally mounted upon the brake arm. A release lever 78 likewise engages the ratchet arm and has a pin 79 thereon engaged in a slot 80 of the ratchet arm to provide a degree of lost motion. A spring 81 is effective in maintaining the ratchet arm in ratcheting position subject to release by manipulation of the release lever 78.

In addition to the normal manipulation of the brake mechanism between braking and brake-releasing position and the adjustment of brake pressure by the composite pins heretofore described, another important incident is the combination which makes it possible to rely upon brake materials constructed of aluminum as a dependable, rugged and long-lived mechanism. To this end the brake drum is reinforced to a considerable degree around that portion of its periphery which receives the major portion of the pressure present when the brake is applied. The thickened portion of the drum serves a double function in that it strengthens and stiffens the brake drum while at the same time providing an area against which the rim of the wheel is adapted to fit. Further still, by providing the thickened portion with the double function made reference to, an added advantage accrues in that when there is a tendency for the brake drum itself to expand under pressure, expansion is resisted by the steel rim of the wheel as promptly as it brought into existence. Hence, the wheel itself is employed as a means of strengthening and improving the character of the brake under these circumstances.

The compactness and neatness of arrangement already made reference to lies in the construction of a brake drum and attendant brake functioning apparatus of such compact size and proportion that it can be received virtually in its entirety within the space between the hub of the wheel and the rim at a location recessed a substantial degree from the plane of the side surface of the wheel or the tire which is mounted thereon. Despite the removed position of the mechanism, the operating lever is located conveniently accessible for either foot or hand operation and for either application or release by a simple means directly connected to the brake mechanism itself. The compact arrangement is hence preserved in the operating lever and its mounting which is kept close to the lateral circumference of the wheel and protrudes outwardly to a limited extent and at a most desirable location. Hence, the neatness of appearance is preserved and the streamlined surface characteristics of the mechanism renders it one easy to preserve in a clean and properly working codition.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention, what we claim as new and desire to secure by Letters Patent is:

1. In a caster wheel comprising a mounting plate assembly, an axle thereon, a hub on the axle, an intermediate portion on the hub and a rim on the exterior circumference of the intermediate portion, the combination of a parking brake comprising a brake drum attached to said hub, the brake drum comprising an annular wall extending concentrically with the axle and an annular flange extending radially outward from said annular wall, the brake drum being expandable into engagement of said flange with said rim and being spaced from and free of said rim when not expanded, post means on the mounting plate assembly extending away from the wheel, a shaft rotatably mounted in said post means, a pair of arcuate brake shoes, a pivotal mount attaching one end of each of said shoes to the plate assembly, a brake setting cam arm between the other ends of said brake shoes and attached to said shaft, a return spring connecting said other ends, and a brake arm non-rotatably secured to said shaft whereby when the brake is operated, a portion of the braking force applied to the brake drum is transferred to the rim.

2. In a caster wheel comprising a mounting plate assembly, an axle thereon, a hub on the axle, an intermediate portion on the hub and a rim on the exterior circumference of the intermediate portion, the combination of a parking brake comprising a brake drum attached to said hub in a position beneath said rim and having an annular wall extending concentrically with the axle and a flange extending outwardly from said annular wall, the brake drum being expandable into engagement of said flange with said rim and being spaced from and free of said rim when not expanded, post means on the mounting plate assembly extending away from the wheel, a shaft rotatably mounted in said post means, an arcuate brake shoe, a pivotal mount attaching one end of said shoe to the plate assembly, a brake setting cam arm at the other end of said brake shoe and attached to said shaft, a return spring connecting said other ends, a brake arm non-rotatably secured to said shaft, a ratchet bar secured to the plate assembly and extending adjacent said arm, a ratchet lever on said brake arm having a ratcheting engagement with said ratchet bar and a release means on said ratchet lever, said pivotal mount comprising a pin rotatably mounted on said mounting plate assembly, said pin having an eccentric pivotal engagement with the brake shoe, and an adjusting element on the respective pin, said rim being adapted to resist a portion of the braking force applied to the brake drum.

3. In a caster wheel comprising a mounting plate assembly, a stub axle thereon, a hub on the axle, a web on the hub and a rim on the exterior circumference of the web having outer and inner rim sections extending on opposite sides thereof, the combination of a parking brake comprising a brake drum attached to said web and said hub in a position concealed beneath one of said rim sections and having an annular wall extending concentrically with the axle and an annular flange extending radially outwardly from said annular wall, the annular wall and the flange being expandable to a position wherein the flange is in engagement with said one rim section and being spaced from and free of said one rim sections when not expanded, a plurality of parallel laterally spaced posts on the mounting plate assembly spaced at different distances from the axle and extending away from the wheel, a shaft rotatably mounted in one of said posts nearer said axle, a pair of arcuate brake shoes, a pivotal mount attaching one end of each of said shoes to the plate assembly, a brake setting cam arm between the other ends of said brake shoes and attached to said shaft, a return spring connecting said other ends, a brake arm non-rotatably secured to said shaft, an arcuate ratchet bar secured to the remaining posts and extending through said arm, a ratchet lever on said brake arm spring biased into ratcheting engagement with said ratchet bar and a release lever on said ratchet lever, at least one of said pivotal mounts comprising a pin rotatably mounted on said mounting plate assembly, said pin having an eccentric pivotally engaging a corresponding brake shoe, and an adjusting element on the respective pin at the end remote from said eccentric pivotal engagement.

References Cited in the file of this patent

UNITED STATES PATENTS

| 1,127,203 | De Young | Feb. 2, 1915 |
| 2,124,773 | Frank | July 26, 1938 |
| 2,241,728 | Loweke | May 13, 1941 |
| 2,288,146 | Sinclair | June 30, 1942 |
| 2,399,654 | Alden et al. | May 7, 1946 |
| 2,431,441 | Willis | Nov. 25, 1947 |
| 2,485,993 | Van Halteren | Oct. 25, 1949 |
| 2,823,921 | Lagaard | Feb. 18, 1958 |

FOREIGN PATENTS

| 157,513 | Sweden | Jan. 8, 1957 |